United States Patent [19]
Austin

[11] 3,884,783
[45] May 20, 1975

[54] DIRECT CURRENT ELECTROLYTIC ETCHING OF ALUMINUM FOIL WITHOUT THE USE OF CONTACT ROLLS

[75] Inventor: Lowell W. Austin, Weirton, W. Va.

[73] Assignee: National Steel Corporation, Pittsburgh, Pa.

[22] Filed: Dec. 18, 1973

[21] Appl. No.: 425,734

Related U.S. Application Data

[63] Continuation-in-part of Ser. No. 284,922, Aug. 30, 1972, abandoned.

[52] U.S. Cl. ................................. 204/129.35
[51] Int. Cl. ..................... B23p 1/16; B23p 1/00
[58] Field of Search .......... 204/28, 33, 129.35, 140, 204/141.5

[56] References Cited
UNITED STATES PATENTS
3,079,308  2/1963  Ramirez et al. ..................... 204/28
3,321,389  5/1967  Anderson et al. ............. 204/129.75

FOREIGN PATENTS OR APPLICATIONS
911,748  7/1946  France ................................ 204/141
691,254  4/1940  Germany ....................... 204/129.35

*Primary Examiner*—R. L. Andrews
*Attorney, Agent, or Firm*—Shanley, O'Neil and Baker

[57] ABSTRACT

In the direct current electrolytic etching of aluminum foil where the foil is exposed to cathodes and rendered anodic in an aqueous solution comprising sodium chloride, current is supplied to the foil by exposing it to anodes in an electrolyte which is most preferably an aqueous solution of sulfuric acid which contains by weight of from about 5 to about 30%, especially from about 20 to about 25%, sulfuric acid. The use of these particular concentrations of sulfuric acid results in less power consumption to produce a particular quality product, less electrolyte usage or dragout advantates compared to other concentrations of sulfuric acid and other electrolytes.

2 Claims, 1 Drawing Figure

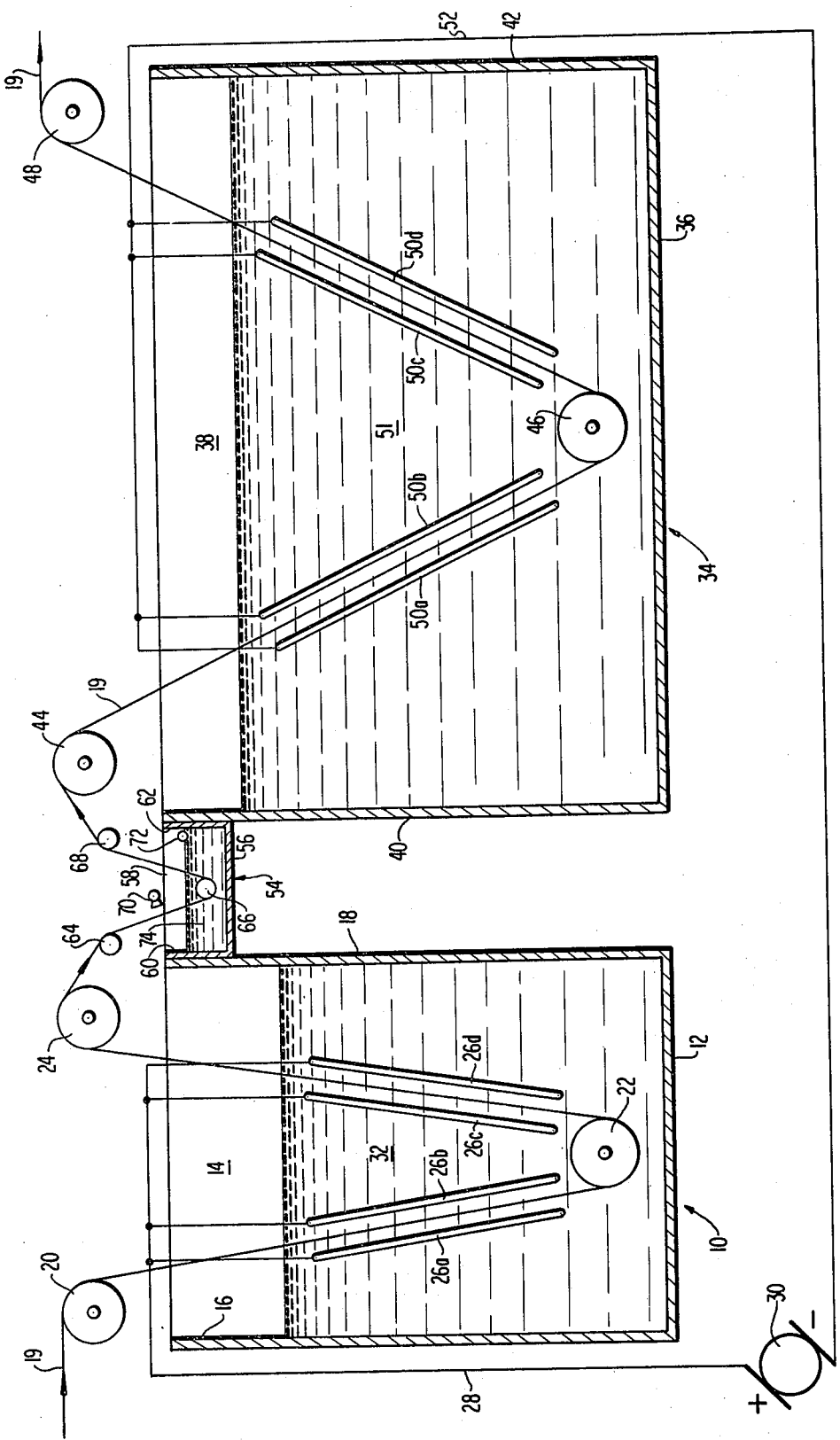

3,884,783

DIRECT CURRENT ELECTROLYTIC ETCHING OF ALUMINUM FOIL WITHOUT THE USE OF CONTACT ROLLS

RELATED APPLICATION

This application is a continuation-in-part of application Ser. No. 284,922, filed Aug. 30, 1972 and now abandoned.

BACKGROUND OF THE INVENTION

This invention relates to the direct current electrolytic etching of aluminum foil for use in the manufacture of electrolytic capacitors, and in particular to one type of such process where etching of foil is carried out by subjecting it to cathodes and rendering it anodic in an aqueous solution comprising sodium chloride.

U.S. Pat. No. 3,316,164 discloses such a process where current is supplied to the foil by electrical contact shoes. In another such process, current is supplied utilizing a stationary bar over which the foil passes prior to entry into the etching bath. In such cases where contact rolls, shoes, bars or the like are utilized to supply current, the side of the foil exposed thereto sometimes is abraded and arcing can occur between the foil and the contact structure thereby resulting in unacceptable product.

Contact rolls and the like have been eliminated in arts other than the direct current electrolytic etching of aluminum foil. See Ramirez et al. U.S. Pat. No. 3,079,308 which discloses a direct current anodizing process in which current is supplied in a contact cell by means of a lead or graphite electrode, and anodizing is carried thereafter in a second cell having lead plate cathodes with the same electrolyte, namely 30% sulfuric acid solution, utilized in both the contact cell and in the anodizing cell. British Pat. No. 467,024 at FIG. 2 discloses an alternating current process for etching aluminum foil in which etching solution is contained in two separate baths and current flows from an electrode in one of the baths through the bath to the foil and along the foil to the second bath and through the solution in that bath to the electrode in that bath.

In line with the teachings of U.S. Pat. No. 3,079,308 and British Pat. No. 467,024 consideration has been given to eliminating contact rolls or the like in the direct current electrolytic etching of aluminum foil by supplying current to the foil by exposing it to anodes in a bath containing the same electrolyte as is used for the etching bath, namely an aqueous solution comprising sodium chloride. When insoluble anodes are utilized, objectionable chlorine gas is produced. When sacrificial aluminum anodes are utilized, there is a violent reaction with much gas being released, reaction continues even after the current is turned off, the foil is attacked even though it is cathodic, and dissolution of the anodes resulting in increased spacing between the anodes and the foil makes process control difficult.

Contact rolls and the like have been eliminated in direct current etching to produce capacitor foil by utilizing a contact cell previous to an etching cell with different electrolytes in the contact cell and the etching cell whereby the above described disadvantages are eliminated. See German Pat. No. 691,254 which discloses an electrolytic etching process in which current is supplied in a degreasing bath consisting of a conventional alkaline medium. The use of an alkaline medium has the disadvantage that dragout into the etching bath can raise its pH to a deleterious level, and this will occur unless there is a washer of sufficient capacity intermediate the degreasing bath and the etching bath and the washer is functioning as designed.

It is an object of this invention to provide a novel method of direct current electrolytic etching of aluminum foil whereby contact rolls or the like are eliminated without the above described disadvantage occurring.

It is a further object to provide a highly preferred embodiment of the invention utilizing particular concentrations of a particular electrolyte in a bath prior to etching wherein current is supplied to the foil whereby power consumption to produce a particular quality product is reduced or electrolyte usage is reduced or dragout into the etching bath can result in an advantage compared to usage of other concentrations of the same electrolyte or to usage of other electrolytes.

These objects and others will be evident from the following detailed description.

BRIEF DESCRIPTION OF THE DRAWING

The single FIGURE of the drawing is a sectional view schematically illustrating a system for carrying out the present invention.

DESCRIPTION OF A PREFERRED EMBODIMENT

With continuing reference to the single FIGURE of the drawing, a tank 10 defining a contact cell has a bottom wall 12, a back sidewall 14, a front sidewall (not shown), an endwall 16 and an endwall 18.

A travel path for movement of an aluminum foil (strip) 19 through tank 10 is provided by means of an inlet roll 20 positioned slightly above tank 10 near endwall 16, a sink roll 22 positioned within tank 10 slightly above bottom wall 12 intermediate endwalls 16 and 18 and an exit roll 24 which is positioned slightly above tank 10 near endwall 18. The travel path is provided by means of the foil passing over roll 20, then under roll 22 and then over roll 24.

Within tank 10 parallel to and on either side of the travel path between rolls 20 and 22 and parallel to and on either side of the travel path between rolls 22 and 24 are grids. Thus, within tank 10 there are four grids which are denoted herein respectively as 26a, 26b, 26c and 26d with 26a being the grid closest to wall 16, 26b being the next closest, 26c being the next closest and 26d being the next. The grids 26a, 26b, 26c and 26d are electrically connected by a lead 28 to the positive side of a generator or other source of dc power 30.

The tank 10 is adapted to contain a bath 32 of a particular electrolyte which is described later to a level above the grids 26a, 26b, 26c and 26d.

Spaced from tank 10 is a tank 34 defining an etching cell. The tank 34 has a bottom wall 36, a back sidewall 38, a front sidewall (not shown), an endwall 40 and an endwall 42. The tank is positioned so that endwall 40 is directly opposite and parallel to endwall 18 of tank 10. The vertical dimension of endwall 40 is the same as the vertical dimension of endwall 18 so that the upper and lower edges of endwall 40 are respectively aligned with the upper and lower edges of endwall 18.

A travel path for movement of foil through tank 34 is provided by means of inlet roll 44 which is positioned slightly above the top of tank 34 and near endwall 40, a sink roll 46 which is positioned within tank 34 near bottom wall 36 intermediate endwalls 40 and 42, and an exit roll 48 which is positioned slightly above the top of tank 10 near endwall 42. The travel path is defined by means of foil passing over roll 44, then under roll 46 and then over roll 48.

Within tank 34 and parallel to and on each side of the travel path between rolls 44 and 46 are grids 50a which is on the side of the travel path nearest wall 40 and 50b which is on the opposite side of the travel path. Within tank 34 parallel to and on opposite sides of the travel path between roll 46 and roll 48 are grids 50c and 50d with 50d being on the side of the travel path between rolls 46 and 48 nearest wall 42 and grid 50c being on the opposite of that travel path. The grids 50a, 50b, 50c and 50d are electrically connected by a lead 52 to the negative side of generator or other source of dc power 30.

The tank 34 is adapted to contain a bath 51 of electrolyte as described hereinafter to a level above the grids 50a, 50b, 50c and 50d.

Intermediate tanks 10 and 34 is a trough 54 which defines a washing zone. The trough 54 has a bottom wall 56, a back sidewall 58, a front sidewall (now shown), an endwall 60 and an endwall 62. The outer surface of the endwall 60 is oriented parallel to the outer surface of the endwall 18 of tank 10 and these outer surfaces are fastened to each other so that the top edge of wall 60 is aligned with the top edge of wall 18. In like manner, the outer surface of the endwall 62 is parallel to the outer surface of the endwall 40 of tank 34 and these outer surfaces are fastened together so that the top edge of endwall 62 is aligned with the top edge of endwall 40.

A travel path for the foil through trough 54 is provided by means of an inlet roll 64 which is slightly above the top of tank 54 near wall 60, a sink roll 66 which is positioned within trough 54 near bottom wall 56 intermediate endwalls 60 and 62 and an exit roll 68 which is positioned slightly above the top of trough 54 near endwall 62. The travel path is defined by means of the foil passing from roll 24 over roll 64 under roll 66 and over roll 68 to roll 44.

A spray header 70 is positioned to spray liquid at the side of the travel path between rolls 64 and 66 removed from wall 60 and is further positioned so that the liquid striking the foil passing along the travel path falls into trough 54.

An overflow outlet 72 is provided in back sidewall 58 near wall 62 at a level such that a bath of liquid 74 is provided in trough 54.

The tanks 10 and 34 and the trough 54 are vertically oriented, of generally rectangular cross section, open at the top and are lined with non-conducting material.

The rolls 20, 22, 24, 64, 66, 68, 44, 46 and 48 are covered with rubber or other non-conducting resilient material so as not to scratch the foil surface.

In operation, the foil is continuously advanced through the contact cell zone of tank 10 denoted a first zone by passage over roll 20 under roll 22 and over roll 24 entering tank 10 just after its passage over roll 20 and leaving tank 10 just before its passage over roll 24. The tank 10 contains a bath of electrolyte 32 as described hereinafter. When the foil is exposed to grids 26a, 26b, 26c and 26d, that is when the foil passes between grids 26a and 26b which have been rendered anodic and between grids 26c and 26d which likewise have been rendered anodic, electric current passes from the grids through the electrolyte into the foil thereby rendering the foil cathodic.

After leaving roll 24, the foil advances passing over roll 64 and into trough 54 where it passes under roll 66 and then leaves trough 54 and passes over roll 68. When the foil passes between rolls 64 and 66, the side of the foil removed from wall 60 is sprayed with liquid emanating from spray header 70 whereby electrolyte on the strip as a result of dragout from tank 10 is removed from the strip. The strip then passes into the bath 74 of rinse liquid where more of the electrolyte is removed.

After leaving roll 68, the foil passes over roll 44 and advances into the etching zone of tank 34 denoted a second zone. The tank 34 contains a bath of electrolyte 51 as described hereinafter. The foil advances into the electrolyte between grids 50a and 50b and under roll 46 and then advances between grids 50c and 50d, then leaves the bath 51 of electrolyte, leaves tank 34 and passes over roll 48 for further processing. When the foil is exposed to grids 50a, 50b, 50c and 50d, that is when the foil passes through the electrolyte between grids 50a and 50b and between grids 50c and 50d, the grids function as cathodes and electric current is passed from the foil as an anode through the electrolyte into the grids whereby the foil is etched.

Typically, the foil advances through the system, that is through tank 10, trough 54 and tank 34 at a rate ranging from about 1 foot per minute to about 20 feet per minute, preferably from about 2 feet per minute to about 15 feet per minute.

The grids 26a, 26b, 26c and 26d that constitute anodes in tank 10 are of material which is insoluble under processing conditions such as, for example, lead or graphite.

The electrolyte in tank 10 consists essentially of an aqueous solution of an inorganic acid such that the solution is highly electrically conductive, does not result in chlorine evolution when exposed to insoluble anodes, is compatible with the electrolyte in tank 34 and does not have a deleterious effect on the etching reaction. The most preferred acid is sulfuric acid. Other acids which are suitable are phosphoric acid, nitric acid, and chromic acid. Usually, the electrolyte in tank 10 contains by weight from about 5 to about 40% of inorganic acid. When the electrolyte in tank 10 is an aqueous solution of sulfuric acid, it should contain by weight from about 5 to about 30% sulfuric acid, optimally from about 20 to about 25% sulfuric acid.

In the contact cell defined by tank 10, the apparent cathode current density, that is the calculated average current density ranges from about 1 ampere per square inch to about 20 amperes per square inch.

The temperature of the electrolyte in contact cell 10 during operation is below its boiling point.

The washing is carried out in two successive steps. First the foil is sprayed with liquid, preferably water by spray header 70. Then the foil is rinsed in the rinse bath 74 in trough 54. By this washing step the major proportion of the electrolyte on the foil due to dragout from container 10 is removed from the foil before it enters etching tank 34.

Turning now to the conditions of etching, it is to be noted that the conditions described particularly hereinafter are those which are preferred.

The electrolyte bath 51 in the etching tank comprises by weight from about 5 to about 30% sodium chloride and water.

The grids 50a, 50b, 50c and 50d usually are insoluble under processing conditions and are, for example, Monel or lead.

The temperature of the etching bath is near but below its boiling point usually at 97°C. plus or minus 2°.

The apparent anodic current density, that is the calculated average current density, ranges from 0.7 to 10 amperes per square inch with a total input into the foil of about 225 to about 950 ampere-seconds per square inch.

The foil haveing been treated in etching tank 34 with the chloride containing electrolyte of bath 51 is washed utilizing a nitric acid rinse to remove chloride.

During operation, the pH in the bath in etching tank 34 desirably should not exceed about 9.5. This is because at high pH's aluminum hydroxide can form and cling to the strip neutralizing nitric acid in the subsequent rinsing step. Moveover, at high pH's, the capacitance of the finished product drops off considerably probably because of chemical etching occurring during the etching step. The pH in the bath in etching tank 34 can go down for example to about 4 without deleterious effect.

As a result of the selection of the aforedescribed electrolyte for the bath in tank 10, a contact cell is practically utilized to supply current for an electrolytic etching process utilizing a bath comprising an aqueous solution of sodium chloride thereby eliminating the need for contact rolls or the like and the disadvantages attendant thereto. As a result of the selection of the aforedescribed electrolyte for use in the contact cell, there is no violent reaction in the contact cell; on the contrary, a quantity of gas is released involving a mild bubbling action which advantageously removes soil present on the foil. Moreover with the selected electrolyte, the foil is not attacked in the contact cell, nor is there a reaction in the contact cell after the current is turned off. Moreover, there is no objectionable chlorine gas released as there would be with insoluble electrodes and electrolyte the same as in the etching bath; and thus, insoluble electrodes can be utilized with the advantage of the spacing between the grids and the foil in the contact cell 10 being maintained constant so that adjustments which have to be made during the progress of the process are minimized.

Moreover, the selection of the particular electrolyte of aqueous sulfuric acid in the aforeprescribed ranges for use in the contact cell 10 provides special advantages in addition to those recited in the above paragraph. The selection of the 5% lower limit on sulfuric acid concentration provides a method where power requirements are commercially suitable. The power requirements decrease as the weight percentage sulfuric acid increases until the weight percentage reaches about 30%; as the weight percentage of sulfuric acid is increased above about 30%, the power requirements progressively increase. In the optimal range of about 20 to about 25%, the power requirements are essentially minimized and there is a savings in acid usage compared to utilizing a concentration of more than about 25%. The upper limit of about 30% has been selected to provide economy of sulfuric acid usage and because at concentrations exceeding this, dragout from the contact cell 10 can disturb processing in the etching cell 34 even despite an intermediate washing step for example as in tank 54. Moreover, the selection of the particular electrolyte of aqueous sulfuric acid in the aforeprescribed ranges for use in the contact cell 10 provides a significant advantage in respect to power consumption to obtain a product of particular capacitance gain compared to utilizing alkaline solution as the electrolyte in the contact cell. Moreover, the use of sulfuric acid in the aforeprescribed ranges provides an advantage over the use of an alkaline electrolyte in respect to dragout. With an alkaline electrolyte dragout into the etching electrolyte can raise the pH of the etching electrolyte to such a high level that (1) aluminum hydroxide is formed which interferes with subsequent nitric acid rinsing and (2) capacitance in the finished product is significantly reduced; thus a washing system of high efficiency in terms of percentage removal of electrolyte from the strip is needed with an alkaline electrolyte. On the other hand, with aqueous sulfuric acid being utilized some dragout into the etching cell can even be advantageous in providing a source of sulfate ions for the etching electrolyte whereby increased etching effect may be obtained.

A specific operating example follows: The apparatus schematically depicted in the FIGURE of the drawing is utilized. The tank 10 is 4 feet deep, 3 feet long (the length dimension is the depicted dimension of bottom wall 12) and 15 inches wide. The electrolyte depth in tank 10 is 3 feet. Each of the grids 26a, 26b, 26c and 26d is of lead and has a long dimension of 2 feet (that is the dimension in the direction of the travel path) and is spaced 2 inches from the travel path (that is, the distance between a grid and the travel path as measured on an imaginary line perpendicular to the plane of the travel path is 2 inches). The electrolyte of bath 32 is an aqueous sulfuric acid solution containing by weight 20% sulfuric acid.

The trough 54 is 6 inches deep and has a horizontal sidewall dimension of 1 foot and a horizontal endwall dimension of 15 inches. The liquid sprayed by spray header 70 is water and the depth of rinse water in tank 54 is 4 inches.

The etching tank 34 has dimensions of 4 feet deep, 6 feet long and 35 inches wide. Each of the grids 50a, 50b, 50c and 50d is of Monel and has a dimension in the direction of the travel path of 2.5 feet and each grid is spaced 2 inches from the travel path (that is, the distance between a grid and the travel path as measured on an imaginary line perpendicular to the plane of the travel path is 2 inches). The electrolyte in tank 34 is an aqueous solution of sodium chloride and sodium sulfate and contains by weight 24% sodium chloride, 0.3% sodium sulfate and the remainder water. The pH of the electrolyte during operation is about 7.

The aluminum foil strip (99.99% by weight pure) advances over roller 20 and into and through the electrolyte in tank 10 where it is exposed to the grids 26a, 26b, 26c and 26d so that electric current is passed from the grids (insoluble anodes) through the electrolyte to the foil as a cathode. The foil advances at a rate of 650 feet per hour. The apparent cathodic current density is approximately 10 amperes per square inch. Hydrogen and oxygen gas bubble off with a rather mild bubbling action advantageously cleaning soil from the strip. The strip is not attacked during passage through tank 10, and when the current supply is shut off, the gas bubbling stops.

The foil then passes over rollers 24 and 64 and then is subjected to spray of water from spray header 70 and rinsing in bath 74 of trough 54 whereby essentially all of the electrolyte on the strip due to dragout from tank 10 is removed. The water is continuously removed from trough 54 by overflow through outlet 72.

The foil strip then advances over rolls 68 and 44 and into etching tank 34 wherein it is passed through the electrolyte in tank 34 and is exposed to the grids (cathodes) 50a, 50b, 50c and 50d whereby electric current is passed from the foil through the electrolyte to the grids and whereby the strip is etched. The apparent anodic current density during the etching is about 8 amperes per square inch with a total input of about 275 ampere-seconds per square inch. The temperature is maintained at 97°C. plus or minus 2°.

The etched foil so produced is suitable for rinsing, annealing if this step has not already been carried out and anodic formation and then is suitable for use in electrolytic capacitors.

Thus, in the present operating example a contact cell 10 takes the place of contact rolls or the like. However, in the present example contrary to where contact rolls or the like are used, there is no abrasion of the foil due to the current supply means and there is no problem of arcing between a contact roll or the like and the foil.

Moreover, contrary to direct current electrolytic etching systems where a contact cell is utilized with an electrolyte the same as in the etching cell there is no objectionable chlorine gas produced, there is no violent reaction, there is no continuation of reaction after the current is turned off, the foil is not attacked in the contact cell and sacrificial anodes need not be utilized so there need not be any problem of progressive change of the spacing between the anodes and the foil making process control difficult.

Beneficial results of no evolution of chlorine gas and no violent reaction are also achieved when an equal weight percentage of phosphoric, nitric or chromic acid is substituted for the sulfuric acid in the above specific operating example.

By utilizing in the above operating example an electrolyte in contact cell 10 which is an aqueous solution of sulfuric acid containing 20% by weight sulfuric acid, power consumption is essentially minimized while acid usage is also minimized in respect to that power consumption. Moreover, with this electrolyte no disadvantages occur even if the washing system of tank 54 allows some dragout from cell 10 into the bath in cell 34.

Where the term aluminum is utilized herein such term is meant to include aluminum alloys containing 95% by weight or more aluminum.

The invention may be embodied in other specific forms without departing from the spirit or essential characteristics thereof. For example, the contact cell as described herein can be utilized with etching processes where foil is subjected to cathodes and rendered anodic other than the etching process particularly described hereinbefore such as, for example, the etching processes of Martin U.S. Pat. No. 3,284,326 or Anderson U.S. Pat. No. 3,321,389 or Welch U.S. Pat. No. 3,316,164 or Hooper Re. 26,892. In view of the variations that are readily understood to come within the limits of the invention, such limits are defined by the scope of the appended claims.

I claim:

1. Method of direct current electrolytic etching of aluminum foil comprising passing electric current into the foil in a contact cell zone to provide an apparent cathode current density ranging from about 1 ampere per square inch to about 20 amperes per square inch by exposing the foil to insoluble anodes in an electrolyte consisting essentially of an aqueous solution containing by weight from about 5 to about 30% sulfuric acid, and passing electric current from the foil as an anode in an etching zone by exposing the foil to cathodes in an aqueous solution comprising sodium chloride.

2. Method as recited in claim 1 in which the anodes in the contact cell zone are composed of lead and the electrolyte in the contact cell zone consists essentially of an aqueous solution containing by weight from about 20 to about 25% sulfuric acid.

* * * * *